US012801783B2

(12) United States Patent
Nguyen et al.

(10) Patent No.: US 12,801,783 B2
(45) Date of Patent: Nov. 17, 2026

(54) METHOD AND SYSTEM FOR VALIDATION OF SENSITIVE DATA REPORTS

(71) Applicant: Accenture Global Solutions Limited, Dublin (IE)

(72) Inventors: Tri Phi Minh Nguyen, Seminole, FL (US); Murtuza Chitalwala, Mumbai (IN); Sriram Thayumanasamy, Madurai (IN); Souma Datta, Howrah (IN); Jayanti Vemulapati, Silver Spring, MD (US)

(73) Assignee: Accenture Global Solutions Limited, Dublin (IE)

( * ) Notice: Subject to any disclaimer, the term of this patent is extended or adjusted under 35 U.S.C. 154(b) by 58 days.

(21) Appl. No.: 19/008,232

(22) Filed: Jan. 2, 2025

(65) Prior Publication Data

US 2026/0187272 A1 Jul. 2, 2026

(51) Int. Cl.
*G06F 21/00* (2013.01)
*G06F 16/2457* (2019.01)
*G06F 21/62* (2013.01)

(52) U.S. Cl.
CPC .... *G06F 21/6245* (2013.01); *G06F 16/24578* (2019.01)

(58) Field of Classification Search
CPC ........................ G06F 21/6245; G06F 16/24578
See application file for complete search history.

(56) References Cited

U.S. PATENT DOCUMENTS 8,635,691 B2 1/2014 Vogel et al.
2018/0285599 A1* 10/2018 Praveen .................. G06F 18/22
(Continued)

FOREIGN PATENT DOCUMENTS

CN 119718398 A * 3/2025
EP 3970309 B1 * 11/2022 ........... G06F 21/602

OTHER PUBLICATIONS

Hamelryck, et al., "Probabilistic Models and Machine Learning in Structural Bioinformatics," Statistical Methods in Medical Research, Jan. 19, 2009, vol. 8, issue 5, pages.

*Primary Examiner* — Ghodrat Jamshidi
(74) *Attorney, Agent, or Firm* — Seed Intellectual Property Law Group LLP

(57) ABSTRACT

The present disclosure discloses methods and systems for validation of sensitive data reports performed by a machine learning-based classifier integrity framework. The method includes receiving a sensitive data report identifying a dataset including columns associated with personally identifiable information, followed by receiving configuration data of the machine learning-based classifier integrity framework, the configuration data corresponds with a predefined list of rules. Further, one or more cells of the dataset associated with a column are scanned to generate an output corresponding to a sensitive attribute using a classification model. Based upon the sensitive data report and the configuration data, the generated output is validated and consequently, a validation report is generated. The validation report comprises whether the dataset identified as including personally identifiable information comprises actual personally identifiable information, an additional review requirement to confirm whether the personally identifiable information is present, or the personally identifiable information is absent.

20 Claims, 8 Drawing Sheets

(56) References Cited

U.S. PATENT DOCUMENTS

| | | | | |
|---|---|---|---|---|
| 2020/0364605 | A1* | 11/2020 | Gorham | G06F 40/216 |
| 2022/0114483 | A1* | 4/2022 | Sabharwal | G06F 16/9536 |
| 2022/0301031 | A1* | 9/2022 | Iyer | G06Q 30/0623 |
| 2022/0398397 | A1* | 12/2022 | Gangadhar | G06F 18/2178 |
| 2022/0405417 | A1* | 12/2022 | Weidner | G06F 16/24573 |
| 2023/0385451 | A1* | 11/2023 | Lockhart, III | G06F 21/6245 |
| 2026/0052149 | A1* | 2/2026 | Dressler | H04L 63/10 |
| 2026/0127676 | A1* | 5/2026 | Dasgupta | G06Q 40/08 |

* cited by examiner

700

| Assigned_Attribute (702) | Assigned_confidence (704) | Assigned_attribut_1 (706) | Assigned_attribute_2 (706) | Assigned_attribute_3 (706) | Assigned_attribute_4 (706) | Assigned_attribute_5 (706) | Assigned_attribute_6 (706) | Sample_size (708) | Sample threshold (710) | Valid-ation (712) | Recommended_Attribute (714) |
|---|---|---|---|---|---|---|---|---|---|---|---|
| Not detected | N.A. | | | | | | | | | SKIP | |
| Last_Name_ | Med-C | last_name(count=82, High-C(p=0.76)) | city(count=10, Med-C(P=0.64)) | first_name(count=6,High-C(p=0.77)) | state(count=1,High-C(p=0.89)) | country(count=1,High-C(p=0.78)) | | 100 | 1 | NEED CHECK | last_name |
| country | High-C | country(count=2, High-C(p=0.83)) | | | | | | 2 | 1 | PASSED | |

FIG. 7

METHOD AND SYSTEM FOR VALIDATION OF SENSITIVE DATA REPORTS

TECHNICAL FIELD

Various examples described herein relate generally to validation of a sensitive data report. Specifically, disclosed examples are directed to a method and a system for validating reports from a sensitive data discovery engine.

BACKGROUND

Today's digital landscape characterized by a heavy reliance on data. Organizations are constantly generating, storing, and managing large volumes of information, in which a significant portion of data may contain sensitive data. The process of identifying and classifying the sensitive data is crucial for maintaining security, privacy, and compliance of information. By accurately identifying and categorizing the sensitive data, the organizations can implement appropriate security measures to protect the sensitive data from unauthorized access, use, or disclosure.

To efficiently handle vast amounts of sensitive data generated and stored, the organizations often leverage automated tools and technologies. The automated tools and technologies may generate classification reports for the sensitive data. However, the reports may require meticulous review and cross-validation by end-users.

SUMMARY

Implementations of the present disclosure are generally directed to validation of sensitive data reports. More particularly, implementations of the present disclosure are directed to methods and systems for validation of a sensitive data report, the said sensitive data report generated by sensitive data discovery engines.

In general, innovative aspects of the subject matter described herein provide a method and a system for validation of the sensitive data report, performed by a machine learning-based classifier integrity framework. The method may include receiving a sensitive data report identifying a dataset including one or more columns associated with personally identifiable information. Further, the method may include receiving configuration data of the machine learning-based classifier integrity framework, the configuration data corresponds with a predefined list of rules. The method may further include scanning one or more cells of the dataset associated with a column of the one or more columns to generate an output corresponding to a plurality of sensitive attributes in the dataset using a classification model. Thereafter, the method may include validating, based upon the sensitive data report and the configuration data, the output corresponding to the plurality of sensitive attributes. Consequently, the method may include generating, based upon the validating, a validation report including information on whether the one or more columns of the dataset identified as including the personally identifiable information comprises actual personally identifiable information, an additional review requirement to confirm whether the personally identifiable information is present, or the personally identifiable information is absent.

The present disclosure further describes a machine-learning based classifier integrity framework system for implementing the method provided herein. The present disclosure also describes non-transitory computer-readable media (CRM) coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the provided aspects and features.

The details of one or more implementations of the present disclosure are set forth in the accompanying drawings and the description below. Other features and advantages of the present disclosure will be apparent from the description and drawings, and from the claims.

DRAWINGS

Various examples in accordance with the present disclosure will be described with reference to the drawings, in which:

FIG. 7 illustrates the validation report generated by the report generator, in accordance with implementations of the present disclosure.

Like reference numbers and designations in the various drawings indicate like elements.

DETAILED DESCRIPTION

Figure 1:
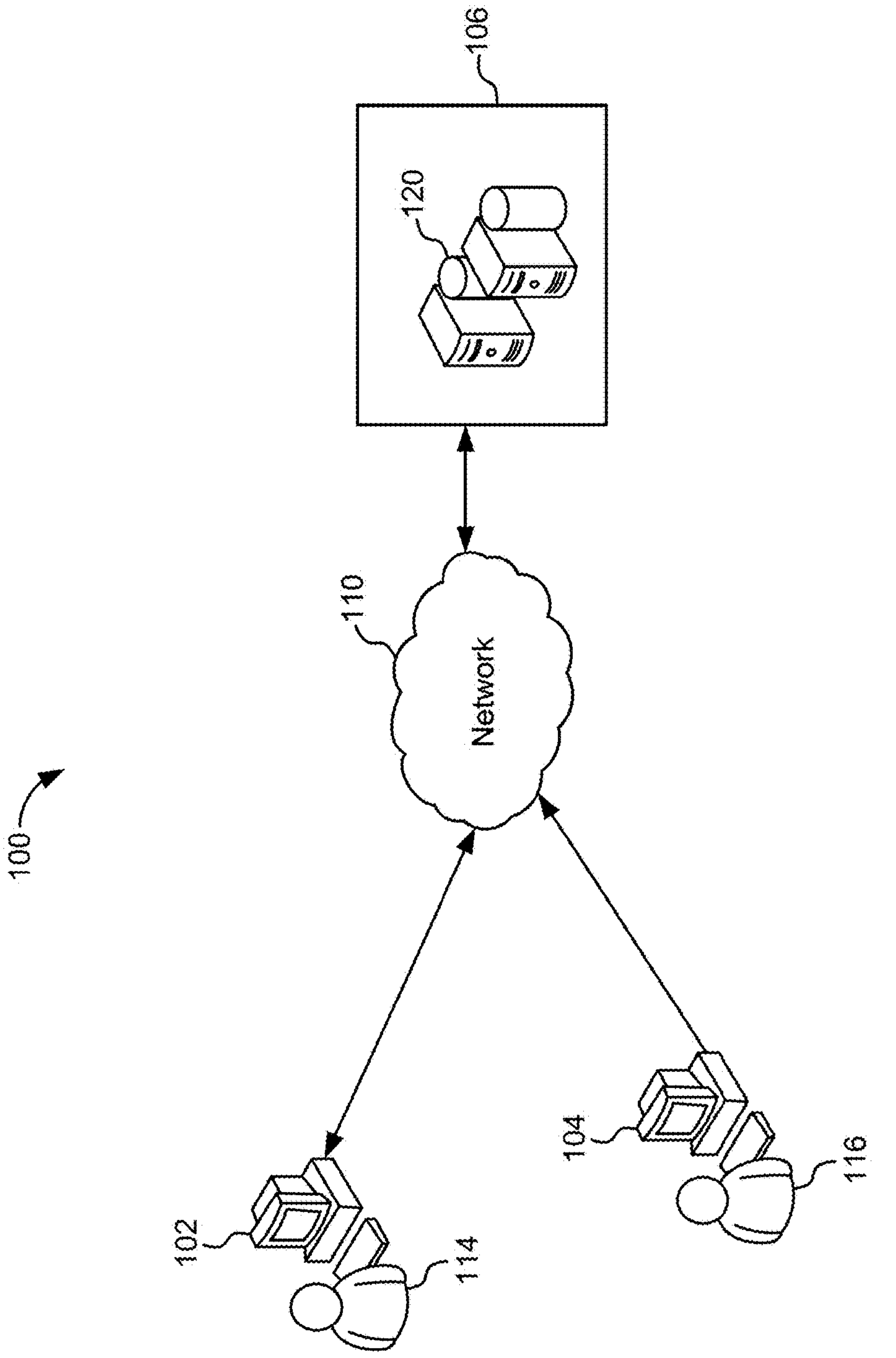
FIG. 1 illustrates an example environment that may be used to execute implementations of the present disclosure.

In the following description, various examples will be illustrated by way of example and not by way of limitation in the figures of the accompanying drawings. References to various examples in this disclosure are not necessarily to the same example, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" (e.g., "for example", "an example of", "by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring details of the examples.

The specification and drawings are to be regarded in an illustrative rather than a restrictive sense. It will, however, be evident that various modifications and changes may be made thereunto without departing from the broader spirit and scope of the invention as set forth in the claims.

It should be noted that terms "sensitive data" and "sensitive information" are used interchangeably throughout the document.

Existing techniques implement sensitive data discovery engines to identify and classify sensitive information within organization's dataset assets. The engines may generate detailed sensitive data reports that identify sensitive data including a wide range of categories, including personal data, financial information, proprietary details, health records, or trade secrets, each with associated unique implications for privacy and security. However, accuracy and completeness of the generated reports are crucial for effective data protection and regulatory compliance. The validation of the reports from the sensitive data discovery engines may ensure that the identified data is accurate, complete, and consistent before the data is used to develop models or generate insights.

While there are several tools that automate the initial identification of the sensitive data and generation of the sensitive data reports, subsequent validation of the sensitive data identification remains a significant challenge. Conventional methods of validating the sensitive data report may include manual review and cross-validation, which are time-consuming and error-prone, especially when dealing with large volumes of data and complex data structures. Thus, significant manual effort may slow down the validation process and increase likelihood of human error. Moreover, the conventional methods may lack ability to understand context of the data, leading to inaccurate classifications. For example, a tool may misclassify a social security number used as an identifier in a non-sensitive context.

Additionally, the conventional methods for validating the sensitive data report may provide limited insights into the accuracy of identified sensitive information. While the conventional methods can determine whether a specific data point is correctly labeled as sensitive or not, however, the conventional methods may lack the ability to provide corrective suggestions. In other words, the conventional methods for validating the sensitive data report cannot identify a correct sensitive attribute for a false positive or suggest alternative classifications.

In view of this, in the present disclosure, a method and a system for validation of the sensitive data report, to overcome above mentioned drawbacks of the conventional methods of validating the sensitive data report, are described. In the present disclosure, a machine learning (ML) based classifier integrity framework is disclosed to automatically validate outputs from sensitive data discovery engines, thereby reducing the need for human intervention.

In the present disclosure, the ML based classifier integrity framework may be provided to intelligently assess the sensitive data reports. The ML based classifier integrity framework may meticulously evaluate the reports for accuracy of classified sensitive data within an organization's dataset. The ML based classifier integrity framework offers informed suggestions for appropriately classifying sensitive data attributes with in-depth explanations using statistical and probabilistic methods. By streamlining the validation process, human effort is reduced while delivering high-quality output supported by cutting-edge implementation. The method disclosed in the present disclosure may holistically evaluates an entire set of sensitive classifiers/attributes required, thereby leading to accurate results. Therefore, the present disclosure aims to streamline and enhance the validation process of sensitive data classifications, ensuring high levels of efficiency, accuracy, and scalability while minimizing dependency on manual efforts and mitigating risks associated with subjective errors.

FIG. 1 depicts an example environment 100 that can be used to execute implementations of the present disclosure.

In some examples, the example environment 100 enables users associated with respective systems to execute requests to generate content by invoking a trained language model in accordance with implementations of the present disclosure. The example environment 100 includes computing devices 102 and 104, back-end system 106, and a network 110. In some examples, the computing devices 102 and 104 are used by respective users 114 and 116 to log into and interact with the back-end system 106 and applications executing on the back-end system 106 according to implementations of the present disclosure.

As shown in FIG. 1, the computing devices 102 and 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites (e.g., web applications executing on the back-end system 106), user devices (e.g., the computing devices 102, 104), and the back-end system 106. In some examples, the network 110 can be accessed over a wired and/or a wireless communications link. For example, mobile computing devices, such as smartphones can utilize a cellular network to access the network 110.

The back-end system 106 includes at least one server system 120. In some examples, the at least one server system 120 hosts one or more computer implemented services that users can interact with by using the computing devices 102 and/or 104. For example, components of enterprise systems and applications can be hosted on one or more of the back-end system 106. In some examples, the back-end system 106 can be provided as an on-premises system that is operated by an enterprise or a third-party taking part in cross-platform interactions and data management. In some examples, the back-end system 106 can be provided as an off-premises system (e.g., cloud or on-demand) that is operated by an enterprise or a third-party on behalf of an enterprise.

In some examples, the computing devices 102 and 104 each include computer executable applications executed thereon. In some examples, the computing devices 102 and 104 each include a web browser application executed thereon, which can be used to display one or more web pages of applications executing on the back-end system 106. In some examples, each of the computing devices 102 and 104 can display one or more GUIs that enable the respective users 114 and 116 to interact with the back-end system 106. In accordance with implementations of the present disclosure, the back-end system 106 may host enterprise applications or systems that require data sharing and data privacy. In some examples, the computing device 102 and/or the computing device 104 can communicate with the back-end system 106 over the network 110.

In some implementations, the back-end system 106 can be implemented in a cloud environment. The back-end system 106 includes at least one server system (or server) 120. In the example of FIG. 1, the back-end system 106 can include various forms of servers including, but not limited to, a web server, an application server, a proxy server, a network server, and/or a server pool. In general, server systems accept requests for application services and provide such services to any number of client devices (for example, the computing device 102 over the network 110).

In some implementations, the back-end system 106 can be used to implement an artificial intelligence (AI) and a machine learning (ML) based classifier integrity framework, trained to generate a validation report by validation of a sensitive data report.

Various examples, depicting validation of sensitive data report, are described in detail in conjunctions with figures below.

Figure 2:
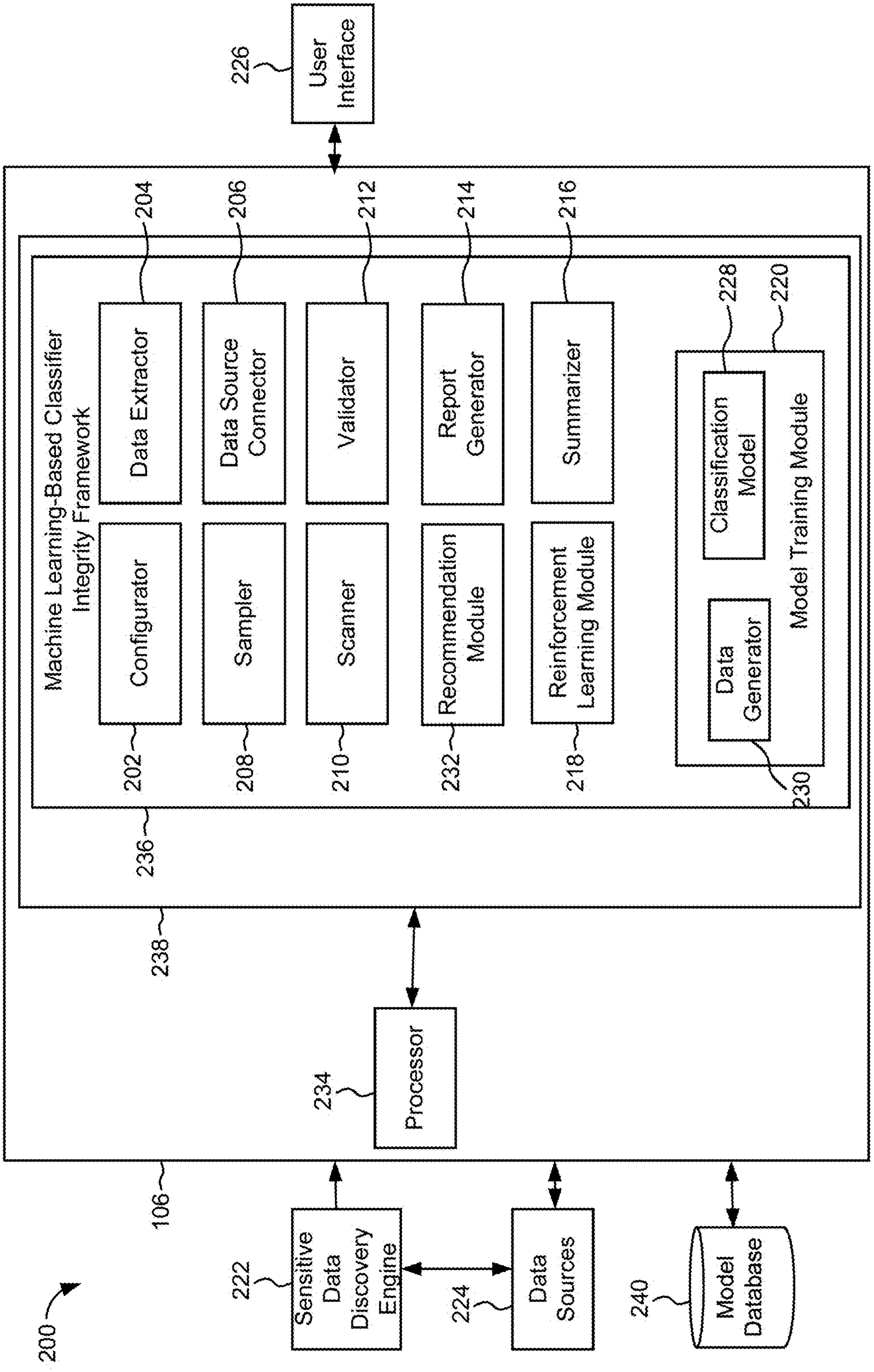
FIG. 2 illustrates an example architecture of a system implementing a machine-learning based classifier integrity framework for validation of the sensitive data report, in accordance with implementations of the present disclosure.

FIG. 2 illustrates an example architecture 200 of the system 106 implementing a machine-learning based classifier integrity framework 236 for validation of the sensitive data report, in accordance with implementations of the present disclosure. The systems 106 may also function as a machine-learning based classifier integrity framework system. The system 106 may include one or more memory 238 storing machine executable instructions and the one or more processors 234 and a user interface 226. As illustrated in FIG. 2, the systems 106 may be communicably coupled to a sensitive data discovery engine 222, data sources 224 and a model database 240. The back-end system 106 may include one or more processors 234 communicably coupled with the memory 238 and configured to execute the machine executable instructions. In some examples, the one or more processors 234 may include, but not limited to, microprocessors, microcomputers, hardware processors, microcontrollers, digital signal processors, central processing units, state machines, logic circuits, Application Specific Integrated Circuits (ASICs), Field Programmable Gate Arrays (FPGAs), and/or any devices that manipulate data or signals based on operational instructions. Among other capabilities, the one or more processors 234 may be programmed to cooperate with non-transitory computer-readable instructions stored in the memory 238 (also referred to be as computer-readable medium) for performing operations according to the present disclosure. The memory 238 may be non-transitory or non-volatile medium, such as a magnetic disk or solid-state non-volatile memory or volatile medium such as Random Access Memory (RAM), and/or the like.

Moreover, the model database 240 may include one or more Large Language Models (LLMs) (also be referenced to as Generative Artificial Intelligence (GAI)) models, foundation models, and/or the like). In an implementation, the LLMs may include pre-trained LLMs or generated LLMs. The pre-trained LLMs may be general-purpose GAI models like large deep learning neural networks, which may be trained using a broad range of generalized and unlabeled training data to perform one or more tasks, such as, human computer interactions (i.e., question and answering), automating process execution, process planning, generating step-by-step procedures for the process execution, performing data analysis, and/or the like. While implementations of the present disclosure are described in further detail herein with non-limiting reference to the LLMs, it is contemplated that implementations of the present disclosure may be realized using any appropriate foundation models or Machine Learning (ML) models, or Artificial Intelligence (AI) models.

In some examples, the memory 238 may include the machine-learning based classifier integrity framework 236. The machine-learning based classifier integrity framework 236 may further include a configurator 202, a data extractor 204, a data source connector 206, a sampler 208, a scanner 210, a validator 212, a report generator 214, a recommendation module 232, a summarizer 216, a reinforcement learning module 218 and a model training module 220.

In some examples, the configurator 202 may receive configuration data of the ML based classifier integrity framework. The configuration data may correspond with a predefined list of rules. Specifically, the predefined list of rules may include, but not limited to, data source configuration rules, model configuration rules, scanner configuration rules, input and output configuration and confidence level and attribute recommendation rules, which are stored in the data source 224. Herein, the data source configuration rules may define specific connectors to be used for accessing and integrating the various data sources 224, such as databases, file systems, and cloud storage platforms. Moreover, the data source configuration rules may define the necessary credentials (for example, usernames, passwords, application programming interface (API) keys) to authenticate and authorize access to (external) data sources 224. The model configuration rules may define rules for selecting an appropriate ML model (for example, a decision tree, a random forest, and/or a neural network etc.) from the model database 240 to be utilized for classifying the sensitive data contained in the data sources 224, by the ML based classifier integrity framework 236. The scanner configuration rules may define top-k attributes that the scanner 210 may prioritize when analyzing data, such as personally identifiable information (PII) or other sensitive data types (for example, protected health information (PHI), payment card industry (PCI), controlled unclassified information (CUI), international traffic in arms regulations (ITAR) or the like). Furthermore, the scanner configuration rules may define desired or user-specified level of parallel processing (e.g., number of executors, CPU cores, memory allocation) to accelerate scanning and analysis process. The input and output configuration may define a source location (e.g., a local file system, a cloud storage and the like) where the PII data or any sensitive data is stored. Additionally, the input and output configuration may define a destination location (e.g., a local file system, a cloud storage and the like) where the validation report is required be exported. The confidence level rules may define a minimum confidence level for the ML based classifier integrity framework's predicted sensitive attributes to ensure accurate classification. Moreover, the attribute recommendation rules may define rules to determine a final attribute assigned to a data element based on the ML based classifier integrity framework's 236 predicted sensitive attributes and other relevant factors. The configuration data may be modified by the user to specific requirements. This customization may facilitate fine-tuning the ML based classifier integrity framework's 236 behavior, ensuring optimal performance and accuracy in data classification and validation tasks.

The system 106 may receive a sensitive data report. The said sensitive data report may identify a dataset including one or more columns associated with the personally identifiable information (PII). Herein, the PII may interchangeably be referred to as protected health information (PHI), payment card industry (PCI), controlled unclassified information (CUI), international traffic in arms regulations (ITAR) or the like. The said sensitive data report may be generated by the sensitive data discovery engine 222 and retrieved by the data extractor 204 for further analysis. PII may refer to information that can be used to identify an individual, such as names, addresses, social security numbers, or email addresses. It is herewith makes clear that the users explicitly consent to the collection and use (as well as the scope of collection and use) of their data before the data is obtained and used; that data is stored per regulations and the user's prior consent, that data is deleted per regulations and the user's prior consent, and that the process operates only on the small slice of data that the user has consented to, and does not operate on a full brain scan worth of data.

In an example, the sensitive data report may be identified as below given table 1. The sensitive data report details identification of the personally identifiable information (PII) within various datasets stored across the different data sources 224. In the below example, the columns associated with the personally identifiable information (PII) may include, a Data Source, a Dataset Path, a Dataset Name, a Column Name, an Attribute Name, and a Confidence Level. In further detail, the Data Source may specify the source of the data, such as local file systems, cloud storage (for example Blob Storage or the like), or databases (for example Snowflake or the like). The Dataset Path may indicate a specific path or location of the dataset within the respective data source. The Dataset Name may specify a name or identifier of the dataset. The Column Name may identify a specific column within the dataset that contains the PII. The Attribute Name may specify a type of PII identified in the column (e.g., account number, phone number, first name, city, country). The Confidence Level may indicate the level of confidence reported by the sensitive data discovery engine 222 in the classification, expressed as a categorical value (e.g., High-C, Med-C, Low-C).

TABLE 1

| Data Source | Dataset_Path | Dataset_Name | Column Name | Attribute Name | Confidence Level |
|---|---|---|---|---|---|
| Local | ../data/attributes/test | data_100K.csv | account number | account number | High-C |
| Local | ./data/attributes/test | data_10K.csv | credit_card_number | phone_number | Med-C |
| blob storage | Validation framework | data_10K.csv | country | first_name | Low-C |
| blob storage | Validation framework | data_100K.csv | city | city | Med-c |
| AWS S3 | data-privacy-macie-poc | validation_framework/data_10K.csv | country | country | High-C |
| AWS S3 | data-privacy-macie-poc | validation_framework/data_100K.csv | title | country | Med-C |
| Snowflake | DEV.CUSTOMER | EMPLOYMENT_INFO | LASTNAME | city | Low-C |

Further, the data source connector 206 may be provided to connect and retrieve data from the data sources 224. The data source connector 206 may support connections to various database systems, including relational databases, thereby, enabling direct access to data stored in the data sources 224. Moreover, the data source connector 206 may retrieve data in different file formats for example, CSV, TSV, XML, JSON, etc., thereby facilitating the integration of data stored in the data sources 224 in various file-based systems.

Furthermore, the sampler 208 may be provided to sample the dataset stored in the data sources 224. Specifically, the sampler 208 may reduce size of the data retrieved from the data sources 224, thereby optimizing scanning process by the scanner 210, particularly when dealing with large datasets. The sampler 208 may utilize the data sources's 224 built-in sampling capabilities (for example, random sampling, stratified sampling, and the like) or may utilize sampling techniques, for example, Pyspark's sampling technique, Bernoulli sampling technique and the like, for reducing the size of the data.

Also, the scanner 210 may scan the cells of the dataset associated with the columns of the sensitive data report, to generate an output corresponding to sensitive attributes using a classification model 228. The classification model 228 may include a logistic regression model and/or a random forest model. The sensitive attributes may refer to the information that, if disclosed, can potentially harm an individual or an organization. For instance, the PII included in the sensitive data report may be referenced herein as sensitive attributes identified by the sensitive data discovery engine 222. The sensitive attributes may relate to privacy and security concerns. Non-limiting examples of the sensitive attributes may include demographic information and the like), health information (for example, medical conditions, genetic information, mental health and the like), financial information (for example, bank account numbers, credit card numbers, income information and the like) and location information (for example, global positioning system (GPS) coordinates, home address, workplace address and the like). The scanner 210 may generate the output, detailing the identified sensitive attributes and corresponding classifications. Specifically, the scanner 210 may identifies the sensitive attributes within the dataset, based on the predicted probabilities the sensitive attribute and predefined thresholds by the configurator 202. The scanner 210 is described in more detail in further paragraphs, in conjunction with the FIG. 3.

In some examples, the model training module 220 may be provided to train the classification model 228. The model training module 220 may further include a data generator 230 and the classification model 228. Specifically, the data generator 230 may be provided to create diverse and representative training data. The data generator 230 may generate synthetic data, augment existing data, or curate a combination of both, thereby ensuring that the classification model 228 is exposed to a wide range of scenarios, improving its ability to accurately identify sensitive attribute. The classification model 228 may be trained on the data generated by the data generator 230 to learn patterns and associations between data features and the sensitive attributes. The classification model's 228 ability to accurately classify data depends on quality and quantity of the training data generated from the data generator 230. The data generator 230 may generate a diverse dataset of labeled examples, where each example consists of a data point and corresponding sensitive attribute label (for example first name, last name, social security number (SSN) or the like). Moreover, the data generator 230 may prepare the training data by collecting, cleaning, and augmenting/transforming. Cleaning and transforming the data may ensure suitability for model training. This may involve tasks like normalization, feature engineering, and handling missing values. Moreover, generating additional training data by applying various transformations to the original dataset augment the classification model's 228 generalization ability. Thereafter, the classification model 228 may be trained on the prepared data (by the data generator 230) using machine learning techniques, for instance, optimization algorithm like gradient descent. The classification model 228 may learn to map input data to the correct output label (sensitive or non-sensitive). After training, the trained classification model 228 may be stored in the model database 240 and may be used to evaluate the validation result (generated by the validator 212) for assessing performance and identify areas for improvement. Metrics like, but not limited to, accuracy, precision, recall, and/or F1-score may be used to measure the classification model's 228 accuracy.

Moreover, the validator 212 may receive the output from the scanner 210. The validator 212 may validate the output corresponding to the sensitive attributes, based upon the sensitive data report and the configuration data. Specifically, the validator 212 may compute a confidence level for the generated output corresponding to the sensitive attribute for each cell of the dataset. Further, the validator 212 may rank the generated output of scanner 210, based on the confidence level computed for each cell of the dataset and based on the list of rules defined by the user. Based on the ranking, the validator 212 may determine the cells of the dataset including the PII. Consequently, based on the ranking are included in the sensitive data report, the validator 212 may verify the cells of the dataset validated to include the personally identifiable information and determine validation result. Specifically, the validator 212 may compare the confidence level of the prediction it calculated with the confidence score from the sensitive data discovery engine 222 and provide the validation result as "passed", "need check", or "skip". The validator 212 in is described in more detail in further paragraphs, in conjunction with the FIG. 3.

Furthermore, the validator 212 may transmit the validation result to the report generator 214. The report generator 214 may generate a validation report 700 (as described in more detail in further paragraphs, in conjunction with the FIG. 7) and display said validation report on the user interface (UI) 226 of the system 106. The validation report 700 may indicate whether the columns of the dataset identified as including the personally identifiable information includes actual personally identifiable information, requires additional review to confirm the personally identifiable information is present, or the personally identifiable information is absent. In other words, the validation report 700, generated by the report generator 214 may provide insights into the accuracy and reliability of the identified sensitive attributes within the dataset of sensitive data report (generated by the sensitive data discovery engine 222). The validation report 700 may ensure that the identified sensitive attributes are indeed sensitive, thereby minimize false alarms and avoid unnecessary security measures.

Moreover, if the validation result is "need check", the recommendation module 232 may provide appropriate sensitive attribute label to be assigned to the dataset. The appropriate sensitive attribute label may assign inferred based on the confidence level of attribute prediction, the user-defined confidence level in the configuration data, and a ratio of identified sensitive attribute to a total number of records in the dataset. The ratio may compare against the predefined list of rules in the configuration data. The recommendation module 232 is described in more detail in further paragraphs, in conjunction with the FIG. 3.

Further, the summarizer 216 may be provided to generate summaries for inclusion in the validation report 700. The summarizer 216 may generate summaries using a large language model (LLM) based on a preference of the user. The summarizer 216 is described in more detail in further paragraphs, in conjunction with the FIG. 4. Moreover, the reinforcement learning module 218 may be provided identify patterns in dataset that indicate the sensitive information, such as the personally identifiable information (PII). The reinforcement learning module 218 may receive feedback on performance and further may continuously learn and adapt to new patterns and edge cases. The reinforcement learning module 218 may adapt to changes in data patterns and emerging threats, continuously refining their decision-making capabilities based on real-time feedback from the users. The reinforcement learning module 218 is described in more detail in further paragraphs, in conjunction with the FIG. 5.

Figure 3:
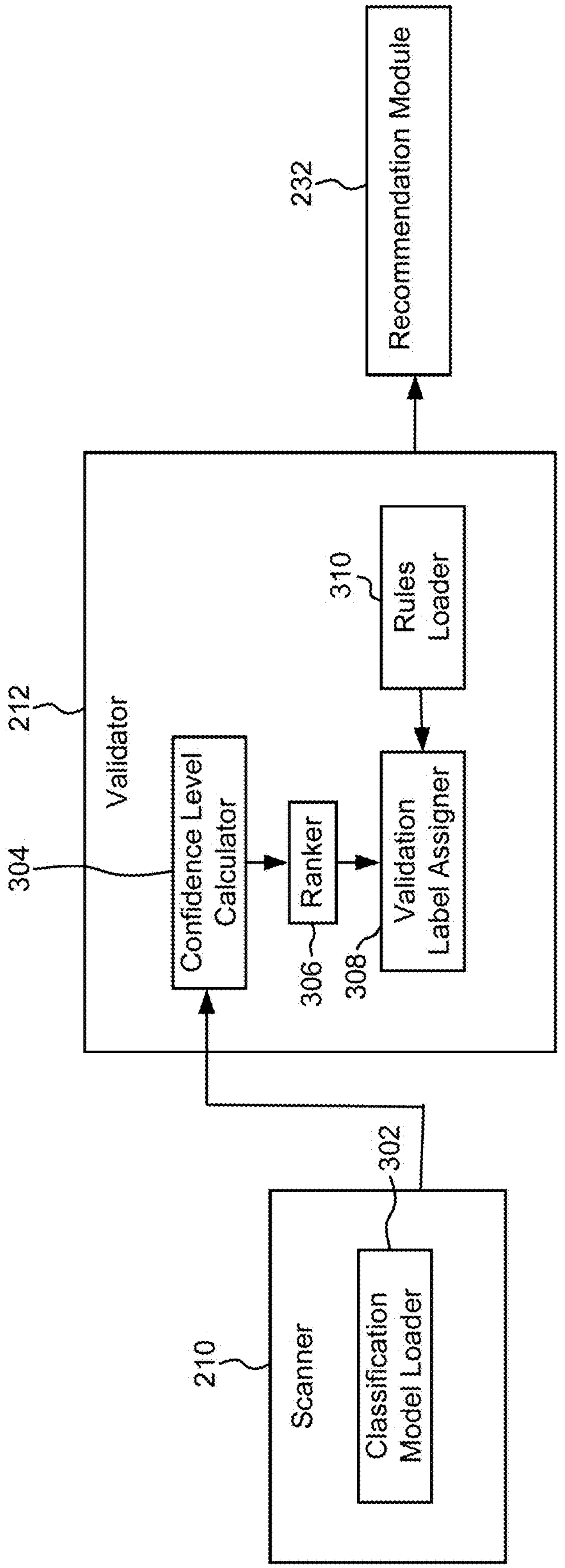
FIG. 3 illustrates a block diagram representation of a scanner, a validator and a recommendation module of FIG. 2, in accordance with implementations of the present disclosure.

FIG. 3 illustrates a block diagram representation of the scanner 210 and the validator 212 of FIG. 2, in accordance with implementations of the present disclosure.

The scanner 210 and the validator 212 may work in conjunction to validate the sensitive data report generated by the sensitive data discovery engine 222. The scanner 210 may further include a classification model loader 302. Specifically, the scanner 210 may scan each cell in dataset contained in the sensitive data report, for the sensitive attributes. For each dataset in the sensitive data report, classification model loader 302 may load the classification model 228 from the model database 240 or any other database, utilizing machine learning based frameworks (for example, Spark big data framework).

Additionally, the scanner 210 may retrieve and scan the data from the data source 224 based on the information provided in the sensitive data report. Specifically, the scanner 210 may scan the data source 224 by utilizing artificial intelligence (AI) and machine learning (ML) techniques. The scanner may be architected as a distributed system, enabling it to handle massive datasets efficiently. The scanner 210 may, further, vectorize data stored in the data sources 224, using the classification model 228. Vectorization may include representing each data point as a numerical vector, where each element of the vector corresponds to a specific feature or attribute. The classification model 228 may be a pre-trained by the model training module 220. Herein, the classification model 228 may be a logistic regression model and/or a random forest model. The classification model loader 302 may load the appropriate classification model based on the specific requirements and characteristics of the data stored in the data sources 224. For instance, the logistic regression model may be suitable for binary classification tasks, such as determining whether the given data point is sensitive or not. Moreover, the logistic regression model may be used when the relationship between the features and the target variable is linear. The logistic regression model may be trained on a labeled dataset, where each data point is associated with a binary label (e.g., sensitive or not sensitive). Given a new data point, the logistic regression model may calculate associated probability belonging to the positive class (sensitive) using a logistic function. Thereafter, based on the predefined threshold, the logistic regression model may classify the data point as sensitive or not sensitive. Furthermore, the random forest model may utilize ensemble learning method that combines multiple decision trees to improve prediction accuracy. The random forest model may classify data points into sensitive and non-sensitive categories. Specifically, multiple decision trees are created by randomly selecting a subset of features and data points from the training dataset. Each decision tree may be trained independently to make predictions. When a new data point is received, each decision tree in the random forest model may provide prediction. The random forest model may determine final prediction by a majority weighted average of the predictions from all the trees. Additionally, the classification model 228 may be, but not limited to, support vector machine (SVM), k-nearest neighbour (kNN) and neuro networks models (for example, convolutional neuro-network (CNN), recurrent neural network (RNN) or the like).

Upon the completion of scanning of the data in the data source 224 by the scanner 210, the trained classification model 228 may classify the cells of the dataset contained in the sensitive data report, into specific categories or labels, indicating the level of sensitivity or the type of PII. Furthermore, the classification model 228 may be used to predict the probability of each data point belonging to the sensitive attribute class. The sensitive attribute class with highest probability may be predicted as a label. For example, for a word "Washington DC" the trained classification model 228 may output labels "City," "FirstName," "LastName," and "Job," with their respective probabilities as 0.7, 0.12, 0.110 and 0.005. The label with the highest probability (0.7 of "City" in this case) may considered most likely prediction. In other words, the data "City" may be considered sensitive data point including information related to the city. Furthermore, the scanner 210 may utilize the capabilities of the classification model 228 may provide k predictions on each datapoint of the dataset of the sensitive data report. The predictions may refer to sensitive attribute identified by the sensitive data report. Each prediction may be assigned with probability p. Sum of all p of predictions is equal to 1. In an example, output of the scanner 210 may be expressed as below given table 2. For each datapoint (Datapoint_1, Datapoint_2, . . . , Datapoint_n) in dataset X, the classification model 228 may be used to generates k predictions (Framework's 1st prediction, Framework's 2nd prediction, . . . , Framework's kth prediction), each accompanied by a probability p. The sum of all probability values p across the predictions equals 1.

TABLE 2

| Dataset X | Framework's 1st prediction | Framework's 2nd prediction | Framework's kth prediction |
|---|---|---|---|
| Datapoint_1 | city (p = 0.4) | country (p = 0.2) | state (p = 0.3) |
| Datapoint_2 | last_name (p = 0.1) | full_name(p = 0.4) | state (p = 0.3) |
| Datapoint_3 | company (p = 0.1) | city (p = 0.6) | country (p = 0.03) |
| Datapoint_n | credit_card_number (p = 0.2) | full_name (p = 0.5) | title (p = 0.1) |

Thereafter, the validator 212 may receive the output (sensitive data label predictions c) from the scanner 210. The validator 212 may further include a confidence level calculator 304, a ranker 306, a validation label assigner 308 and a rules loader 310. The confidence level calculator 304 may processes the output from the scanner 210 and determine the appropriate attribute to assign to each data point in the dataset. Among a k label predictions from the scanner 210 for the datapoint, the confidence level calculator 304 may process the prediction with the highest probability p. For example, the output of the confidence level calculator 304 may be expressed as below table 3:

TABLE 3

| Dataset X | Framework's prediction with highest probability |
|---|---|
| Datapoint_1 | city (p = 0.4) |
| Datapoint_2 | full_name(p = 0.4) |
| Datapoint_3 | city (p = 0.6) |
| Datapoint_n | full_name (p = 0.5) |

Moreover, the ranker 306 may identify top-k most likely sensitive data labels across the entire dataset of sensitive data report. Specifically, the ranker 306 may receive the output from the confidence level calculator 304 and identify "m" distinct sensitive data labels from the "n" labels assigned to the "n" datapoints in dataset X ("m" may be significantly smaller than "n"). Further, the ranker 306 may compute, for each of the m distinct labels, an average probability associated with the label. The ranker 306 may, further, count the total number of data points assigned to each of the m labels followed by ranking all m labels in descending order based on associated calculated average probability. Consequently, the ranker 306 may determine confidence level (high, medium, low) for each sensitive data label. For example, the output of the ranker 306 may be expressed as below table 4:

TABLE 4

| Dataset X | Framework's prediction with highest probability |
|---|---|
| | city (average probability = 0.7),<br>CL = High_Confidence, count = 200<br>full_name (average probability = 0.45),<br>CL = Low_Confidence, count = 180<br>credit_card_number (average probability = 0.31),<br>CL = Low_Confidence, count = 100 |

dation outcome may determine an outcome of the validator 212 by comparing the confidence level calculated by the confidence level calculator 304 against the rules loader's 310 specified confidence level.

The validation label assigner 308 may integrate the outputs from the ranker 306, the rules loader 310, and the sensitive data report to determine the final validation result to generate the validation report 700. For each entry in the validation report 700, the validation label assigner 308 may determine feedback and categorize the feedback into one of three distinct categories. The said categories may include "passed", "need check" and "skip". Specifically, the category "passed" may indicate that the sensitive data attribute identified by the sensitive data discovery engine 222 matches the sensitive data attribute identified by the validator 212, therefore, no further manual validation is required. The category "skip" may indicate that the validator 212 cannot make a conclusion due to insufficient statistical evidence. In other words, the category "skip" may indicate that both validator 212 and sensitive data discovery engine 222 find no sensitive data on a particular dataset, hence, no further manual validation needed. The category "need check" may indicate that the sensitive data attribute identified by the sensitive data discovery engine 222 does not matches the sensitive data attribute identified by the validator 212.

Moreover, when the validation label assigner 308 (in the validator 212) provides feedback as "need check", the recommendation module 232 may analyze all predictions and associated statistics, integrating them with user-defined rules to suggest the most likely sensitive data attribute (e.g., "personal name," "email," "SSN," etc.) for the dataset. This recommendation may serve as a reliable hint for the end-user to conduct further investigations, significantly reducing the need for manual validation from scratch. In an example, the output of the recommendation module 232 may be expressed as below table 5:

TABLE 5

| Data Set | Column | 1st Prediction | 2nd Prediction | 3rd Prediction | 4th Prediction | 5th Prediction | Sample Size | Validation | Recommendation Sensitive Data Label |
|---|---|---|---|---|---|---|---|---|---|
| D | C1 | last_name (count = 82, High-C (p = 0.76)) | city (count = 10, Med-C (p = 0.64)) | first_name (count = 6, High-C (p = 0.77)) | state (count = 1, High-C (p = 0.89)) | country (count = 1, High-C (p = 0.78)) | 100 | NEED_CHECK | last_name |

Further, the rules loader 310 may be provided to specify rules that the validator 212 may consider during validation, thereby, providing flexibility for validating different applications. The rules may include data count threshold, confidence level range and validation outcome. The data count threshold may specify the percentage of data points classified under the sensitive data label relative to a total number of data points. Labels with a proportion lower than the configured threshold may be excluded from the results. The confidence level range may define the mapping between probabilities and confidence levels. For example, the average probability of the predicted sensitive data label between 0.65 and 1.0 may be considered as high-level confidence prediction. Similarly, the probability between 0.33 and 0.65 may be considered as medium-level confidence. The vali- In the example above, the first prediction ("last_name") is recommended by the recommendation module 232 because it has a high confidence level (p=0.76), and 82% of the data points in the dataset are classified as "last_name". These statistics may exceed the thresholds set in user-defined rules for the recommendation module 232 (assuming user set data count threshold of 75%, probability threshold of 0.6).

Figure 4:
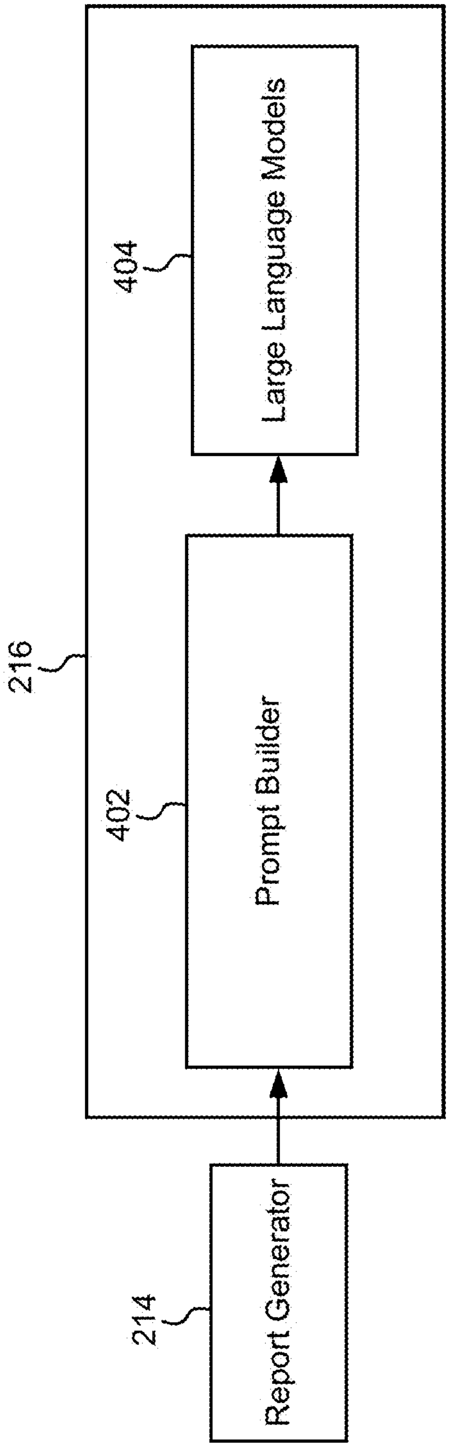
FIG. 4 illustrates a block diagram representation of a summarizer of FIG. 2, in accordance with implementations of the present disclosure.

FIG. 4 illustrates a block diagram representation of the summarizer 216 of FIG. 2, in accordance with implementations of the present disclosure. The summarizer 216 may further include a prompt builder 402 and a large language model (LLM) 404. The summarizer 216 may receive the validation report 700 generated by the report generator 214 and generate concise and informative summaries of validation report 700. Specifically, the prompt builder 402 may be provided to generate specific for the LLM 404. The generated prompts may instruct the LLM 404 to generate summaries, customized to the specific needs of different user groups. The prompts may utilize the LLM 404 to identify and summarize key findings, such as the types of sensitive data detected, severity of issues, and the recommended actions. Herein, the severity of a data breach may be categorized into several levels (for instance critical, high, medium and low) based on the type of sensitive data compromised. Specifically, the critical level may include highly sensitive data, for example passwords, biometric information financial data or the like, which, if exposed, may lead to severe consequences, including identity theft and financial loss. The high level may include sensitive data that, if exposed, may lead to financial loss, identity theft, or reputational damage. Non-limiting examples may include usernames, PINs, credit card numbers, and social security numbers. The medium level may include sensitive data, such as physical addresses, dates of birth, and phone numbers, which, while not as critical as high-severity data, can still be used for targeted attacks or identity theft. The low level may include sensitive data, such as email addresses, IP addresses, and time zones, which, while not directly identifying individuals, can still be used in conjunction with other information to compromise privacy. Based on said classifications, the LLM 404 may recommend appropriate actions, like, but not limited to, restricting access to the data source, masking or anonymizing sensitive data, or implementing additional security measures. Additionally, the prompts may instruct the LLM 404 to highlight the results of the validation process and their potential impact on the organization. Moreover, prompt builder 402 may generate prompts to include user-defined specific details, such as data sources, column names, and confidence levels. Herein, the non-limiting examples of LLM 404 may include GPT-4 and LLaMA 2. The LLM 404 may utilize machine learning (ML) and natural language processing (NLP) to process the prompts generated by the prompt builder 402.

Figure 5:
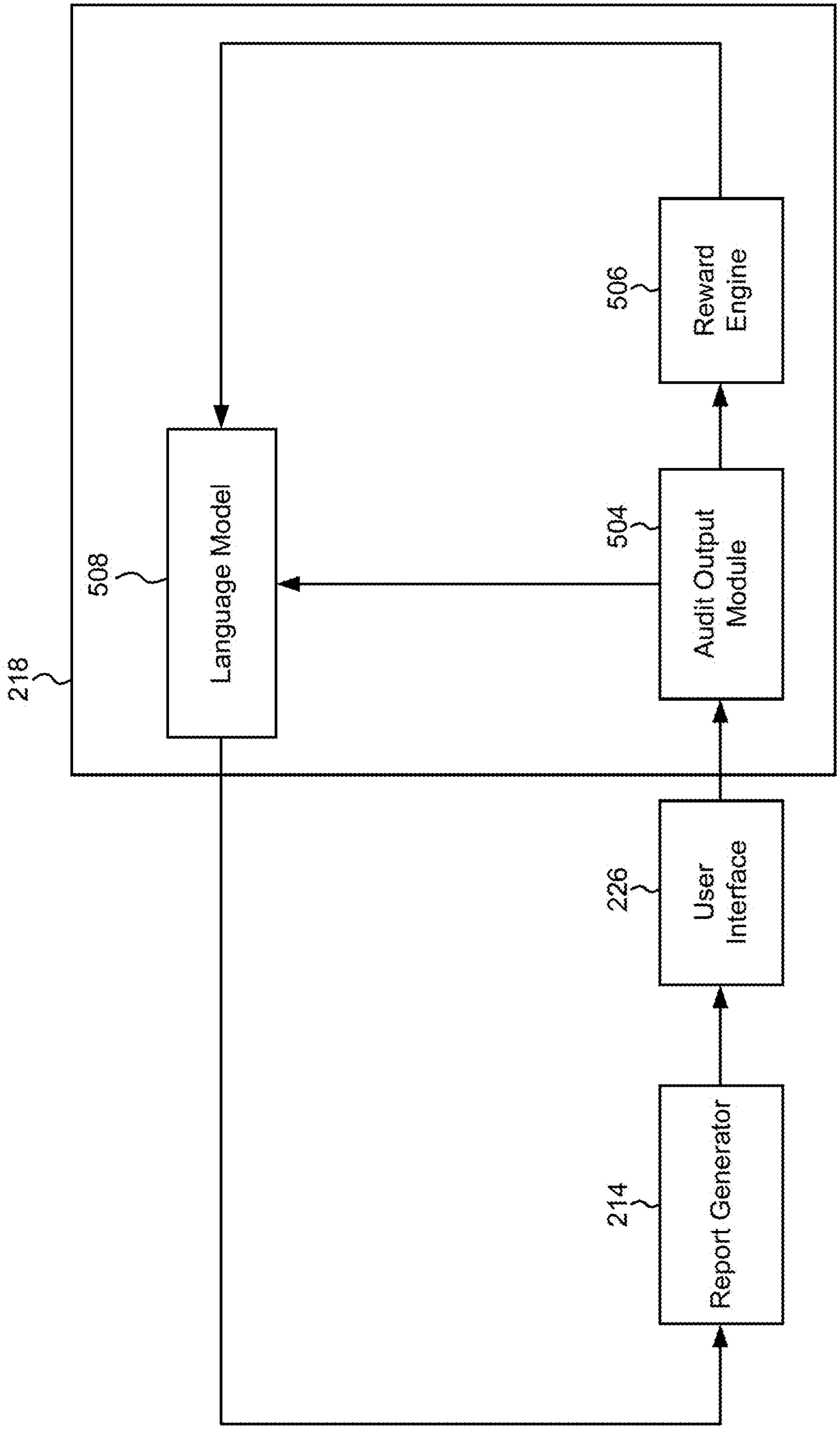
FIG. 5 illustrates a block diagram representation of a reinforcement learning module of FIG. 2, in accordance with implementations of the present disclosure.

FIG. 5 illustrates a block diagram representation of the reinforcement learning module 218, in accordance with implementations of the present disclosure. The reinforcement learning module 218 may include the user interface (UI) 226, an audit output module 504, a reward engine 506 and a language model 508.

The UI 226 may receive the validation report 700 generated by the report generator 214. The validation report 700 may be presented to the user through the UI 226. In some examples, the validation report 700 may be presented to the user through one or more of the computing devices 102 and 104. The user may review the validation report 700 and provide feedback on the accuracy of the identified sensitive attributes. Thereafter, the user's feedback may be captured by the audit output module 504 and processed by the reward engine 506. The reward engine 506 may assign rewards or penalties based on the accuracy of the validation output. Positive rewards may be assigned for correct classifications, while negative rewards may be assigned for incorrect ones. Furthermore, the language model 508 may receive the validation results, process the validation results, and generate predictions about the presence of sensitive attributes. Additionally, the language model 508 may receive the reward from the reward engine 506 and update its policy. The policy may guide the language model's 508 future decisions, aiming to maximize the cumulative reward. The language model 508, informed by its updated policy, may generate new predictions for incoming validation results.

Figure 6:
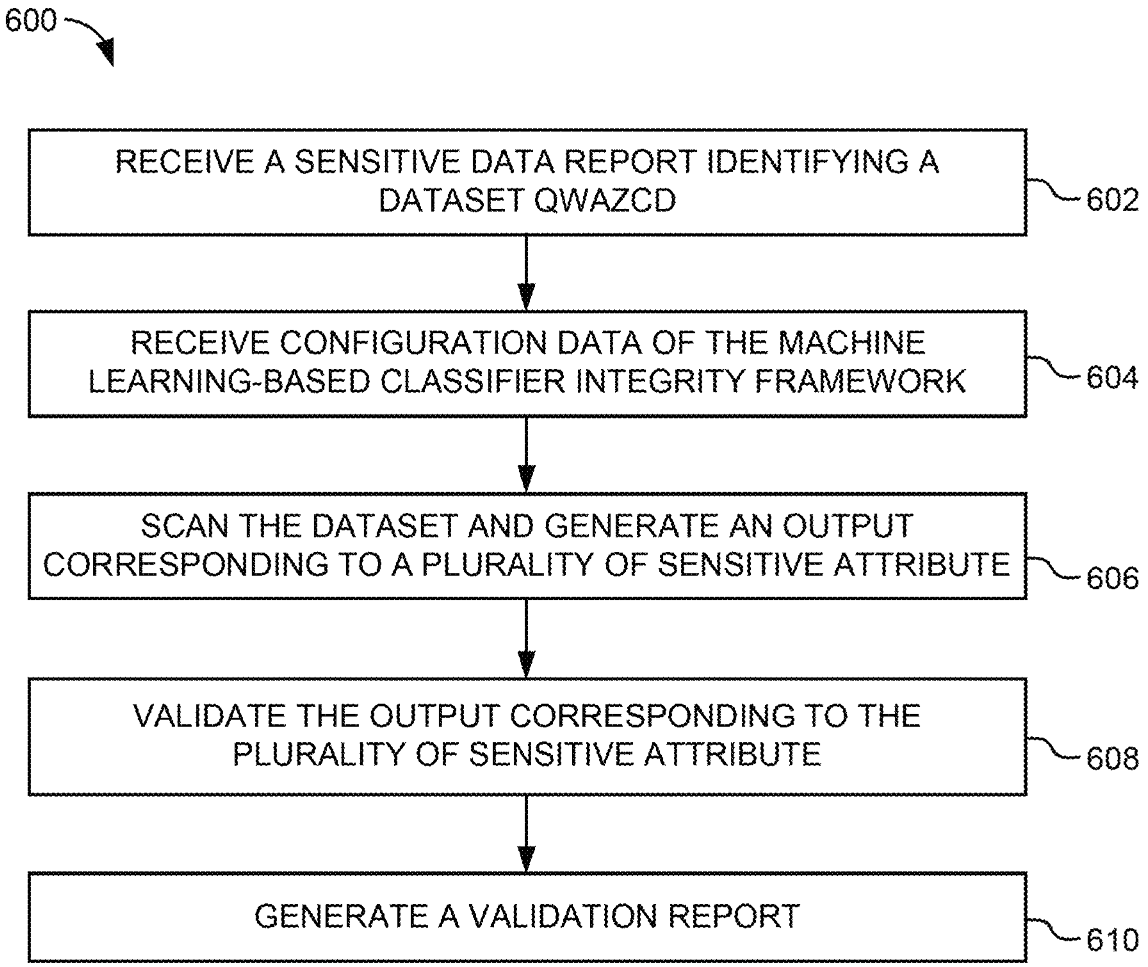
FIG. 6 illustrates a flow diagram of an example method implemented by the machine learning-based classifier integrity framework, in accordance with implementations of the present disclosure.

FIG. 6 illustrates the flow diagram of an example method 600 implemented by the machine learning-based classifier integrity framework, in accordance with implementations of the present disclosure.

The method 600 may include receiving 602 the sensitive data report identifying the dataset including one or more columns associated with personally identifiable information (PII). Herein the PII may refer to the sensitive data attribute identified by the sensitive data discovery engine 222.

The method 600 may include receiving 604 configuration data of the machine learning-based classifier integrity framework. The configuration data may correspond with the predefined list of rules. Specifically, the predefined list of rules may include data source configuration rules, model configuration rules, scanner configuration rules, input and output configuration and confidence level and attribute recommendation rules. The configuration data may be modified by the user as per the requirements.

The method 600 may include scanning 606 one or more cells of the dataset associated with the column of the one or more columns to generate the output corresponding to the sensitive attribute using the classification model 228. Specifically, the output may include classification the cells of the dataset contained in the sensitive data report, into specific categories or labels, indicating the level of sensitivity, classify the cells of the dataset contained in the sensitive data report, into specific categories or labels, indicating the level of sensitivity. Herein, the classification model 228 may be the logistic regression model and/or the random forest model. Additionally, scanner 210 may, further, vectorize data stored in the data sources 224, using the classification model 228.

The method 600 may include validating 608 the output corresponding to the sensitive attribute, based upon the sensitive data report and the configuration data. Specifically, the validator 212 may receive the output of scanner 210 and verify the cells of the dataset validated to include personally identifiable information and determine validation result, as "passed", "need check", or "skip".

The method 600 may include generating 610, based on the validation, the validation report 700 containing whether the one or more columns of the dataset identified as including personally identifiable information includes actual personally identifiable information, requires additional review to confirm PII is present, or PII is absent. The generated validation report 700 may be displayed on the user interface (UI) 226.

Implementations of the present disclosure provides technical solutions to multiple technical problems that arise in the context of validation of sensitive data report. For example, in the present disclosure the validator 212 may compare the confidence level calculated by the confidence level calculator 304 against the rules loader's 310 specified confidence level. This methodology may reduce false positives compared to pattern/dictionary based or comparison with a selected predefined data. Furthermore, the validator 212 may validate each row in the sensitive data report by leveraging distributed computing to ensure scalability, making it possible to handle large datasets efficiently, an otherwise impractical task to perform manually. In other words, with the support of distributed computing, the machine learning-based classifier integrity framework may facilitate complete coverage, enhancing both accuracy and confidence in the validation results.

The scanner 210 may be architected as a distributed computing system, enabling it to scale horizontally to accommodate increasing data volumes. In other words, the scanner 210 may add more nodes to the cluster, to accommodate increasing data volumes and processing demands. The scanner 210 can distribute the workload across multiple nodes, accelerating the scanning and validation process. The system can continue operating even if some nodes fail, ensuring high availability and reliability. The distributed computing system may facilitate parallel processing of data across multiple nodes, significantly improving the system's capacity to handle large-scale data sets. By distributing the workload, the scanner 210 may efficiently scan and validate unlimited volumes of data, ensuring timely and accurate results.

Additionally, the rules loader 310 may be provided to enhance the flexibility and adaptability of the sensitive data validation system. The rules loader 310 may recognize the diverse nature of data and varying organizational requirements and facilitate the customization of validation criteria. By introducing user-defined rules, organizations may tailor the system to their specific needs, ensuring accurate and effective identification of sensitive information across different domains and industries.

Further, the recommendation module 232 may leverage statistical analysis to provide evidence-based recommendations. These recommendations may guide end-users towards potential areas of concern, reducing the need for extensive manual validation. By offering data-driven insights, the recommendation module 232 may enhance the efficiency and accuracy of the sensitive data validation process.

Moreover, the validation report 700 may provide elaborated explanation on detected sensitive attributes by combining several statistical methods, it provides justifiable recommendation on which sensitive attribute should be assigned on which data.

In further detail, the classification model 228 may be trained by the model training module 220 to categorize the various sensitive attributes that are retrieved data sources 224. By first categorization the sensitive data, appropriate action for protection can be determined.

Furthermore, the machine learning-based classifier integrity framework 236 may be implemented on parallel processing paradigm that enable scalable model inference capability in both real-time and batch mode. Specifically, the scanner 210 and validator 212 may be implemented with dynamic resource allocation in distributed facilities, thereby enabling scalable validation on large datasets. Moreover, the scanner 210 may utilize parallel processing to expedite the classification of sensitive data. The parallel processing may include simultaneously analyzing multiple data points using the loaded classification model 228, rather than processing them sequentially. By leveraging parallel processing, the scanner 210 may reduce the overall processing time and enhances the efficiency of the sensitive data identification process. Parallel processing may further enable efficient utilization of available computational resources, such as CPU cores and GPU cores, thereby maximizing the throughput of the scanning process and minimizing idle time.

In the present disclosure, the machine learning-based classifier integrity may be provided with flexible computing resources. Specifically, users may specify amount computing resources (e.g., number of CPU or RAM memory) allocated to validation by the validator 212, thereby, scaling up infinitely when dataset is very large. Users can save computing resources by allocating fewer computing resources.

FIG. 7 illustrates the validation report 700 generated by the report generator 214, in accordance with implementations of the present disclosure. In an example the validation report 700 may include columns: assigned attribute 702, assigned confidence 704, assigned attribute (1 to 6) 706, sample size 708, sample threshold 710, validation 712 and recommended attribute 714. Herein, the column assigned attribute 702 may represent attribute assigned to the data by the validator 212. The column assigned confidence 704 may represent the confidence level calculated by the confidence level calculator 304 (for example, High-C, Med-C, Low-C). The columns assigned attribute (1 to 6) may represent attributes assigned by the validator 212, with increasing confidence levels. The column sample size 708 may represent the number of samples used to validate the assigned attribute. The column sample threshold 710 may represent the threshold used to determine the confidence level of the validation. The column validation 712 may represent the end validation result (for example, passed, need check or skip). The column recommended attribute 714 may represent the recommended sensitive data attribute in case the end validation result is "need check". In essence, the validation report 700 may provide a comprehensive analysis of the sensitive data report (as shown in Table 1) identified by the sensitive data discovery engine 222, thereby, offering accurate classifications, confidence levels, and actionable recommendations. The validation report 700 may be used to implement effective data protection measures and mitigate potential risks.

Figure 8:
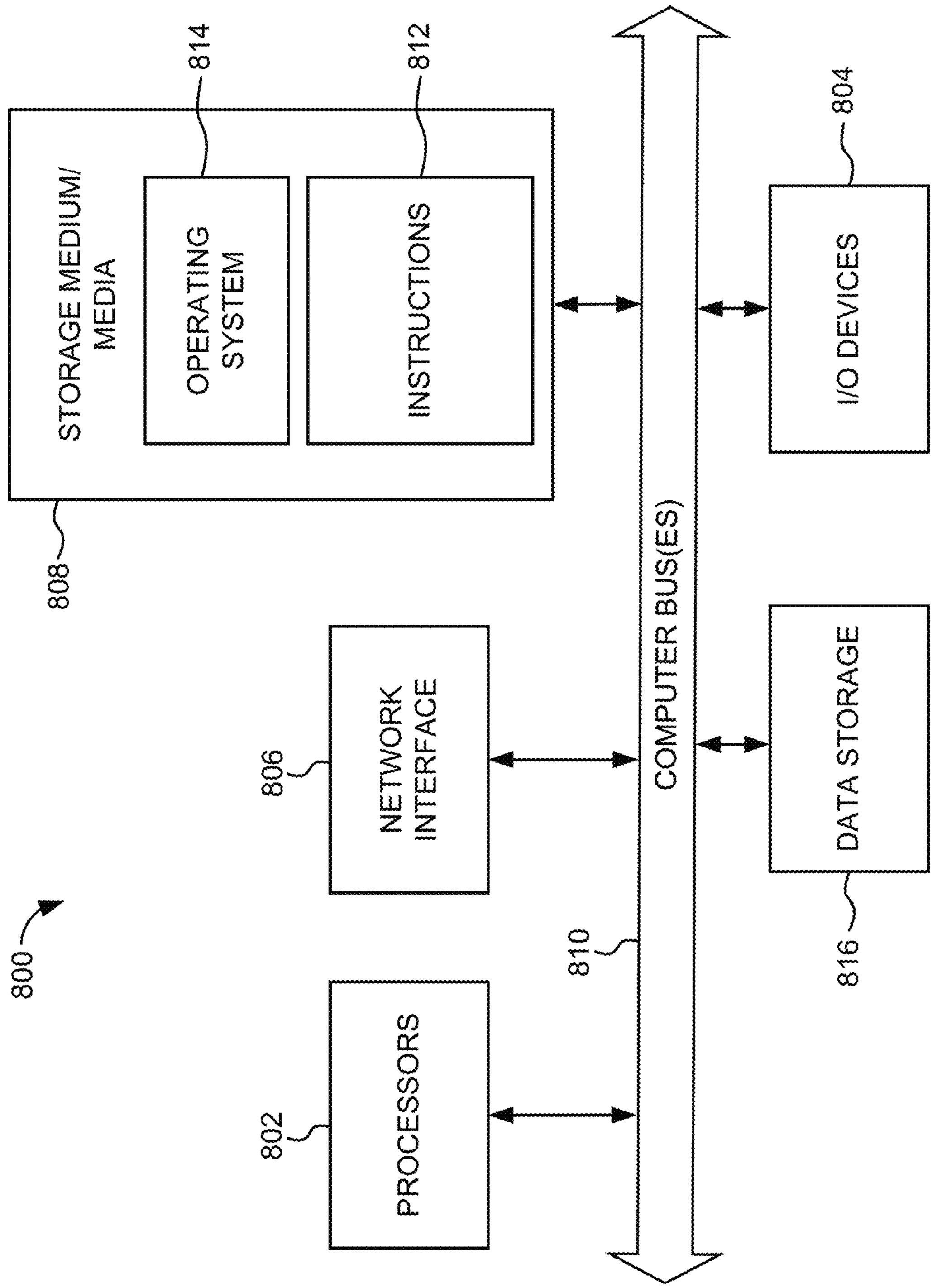
FIG. 8 illustrates a computer system that may be used to implement the system for validation of sensitive data report, in accordance with implementations of the present disclosure.

FIG. 8 illustrates a computer system 800 that may be used to implement the system 106 for validation of the sensitive data report, in accordance with implementations of the present disclosure. More particularly, computing machines such as desktops, laptops, smartphones, tablets, and wearables which may be used to implement the tasks that may have the structure of the computer system 800. The computer system 800 may include additional components not shown and that some of the process components described may be removed and/or modified. In another example, a computer system 800 may be deployed on external-cloud platforms such as cloud, internal corporate cloud computing clusters, organizational computing resources, and/or the like.

The computer system 800 includes processor(s) 802, such as a central processing unit, ASIC or another type of processing circuit, input/output devices 804, such as a display, mouse keyboard, etc., a network interface 806, such as a Local Area Network (LAN), a wireless 502.11x LAN, a 3G or 4G mobile WAN or a WiMax WAN, and a computer-readable medium 808. Each of these components may be operatively coupled to a bus 810. The computer-readable medium 808 may be any suitable medium that participates in providing instructions to the processor(s) 802 for execution. For example, the computer-readable medium 808 may be non-transitory or non-volatile medium, such as a magnetic disk or solid-state non-volatile memory or volatile medium such as RAM. The instructions or modules stored on the computer-readable medium 808 may include machine-readable instructions 812 executed by the processor(s) 802 that cause the processor(s) 802 to perform the methods and functions of the system for validating sensitive data report.

The system may be implemented as software stored on a non-transitory processor-readable medium and executed by the processors 802. For example, the computer-readable medium 808 may store an operating system 814, such as MAC OS, MS WINDOWS, UNIX, or LINUX, and code for the system. The operating system 814 may be multi-user, multiprocessing, multitasking, multithreading, real-time, and the like. For example, during runtime, the operating system 814 is running and the code for the system is executed by the processor(s) 802.

The computer system 800 may include a data storage 816, which may include non-volatile data storage. The data storage 816 stores any data used or generated by the system.

The network interface 806 connects the computer system 800 to internal systems for example, via a LAN. Also, the network interface 806 may connect the computer system 800 to the Internet. For example, the computer system 800 may connect to web browsers and other external applications and systems via the network interface 806.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by a machine learning-based classifier integrity framework, the computer-implemented method comprising:

receiving a sensitive data report identifying a dataset including one or more columns associated with personally identifiable information;

receiving configuration data of the machine learning-based classifier integrity framework, the configuration data corresponds with a predefined list of rules;

scanning one or more cells of the dataset associated with a column of the one or more columns to generate an output corresponding to a plurality of sensitive attributes in the dataset using a classification model;

validating, based upon the sensitive data report and the configuration data, the output corresponding to the plurality of sensitive attributes, wherein validating the output corresponding to the sensitive attributes comprises:

computing a confidence level for the generated output corresponding to each of the plurality of sensitive attributes of the dataset;

ranking, based on the confidence level and the predefined list of rules defined by a user, the generated output corresponding to each of the plurality of sensitive attributes of the dataset; and determining, based on the ranking, the one or more cells of the dataset includes the personally identifiable information; and generating, based upon the validating, a validation report comprising:

information on whether the one or more columns of the dataset identified as including the personally identifiable information comprises actual personally identifiable information, an additional review requirement to confirm whether the personally identifiable information is present, or the personally identifiable information is absent.

2. The computer-implemented method of claim 1, further comprising verifying whether the one or more cells of the dataset validated to include the personally identifiable information based on the ranking are included in the sensitive data report.

3. The computer-implemented method of claim 1, wherein the classification model includes a logistic regression model and/or a random forest model, and wherein the method further comprising vectorizing data of the dataset using the classification model.

4. The computer-implemented method of claim 1, further comprising sampling the dataset prior to the scanning.

5. The computer-implemented method of claim 4, wherein the sampling is performed using Pyspark's sampling algorithm or Bernoulli sampling algorithm.

6. The computer-implemented method of claim 1, further comprising generating summaries of the output corresponding to the plurality of sensitive attributes for inclusion in the validation report, the summaries are generated using a large language model (LLM) based on a preference of a user.

7. The method of claim 1, wherein validating, based upon the sensitive data report and the configuration data, the output corresponding to the plurality of sensitive attributes further comprises:

determining a data count threshold specifying a percentage of data points classified under a sensitive data label relative to a total number of data points;

excluding, labels having a proportion lower than the configured threshold; and defining, a confidence level range, wherein the confidence level range is used to define a mapping between probabilities and confidence levels.

8. The method of claim 1, wherein generating the validation report comprises generating, evidence-based recommendations using statistical analysis to guide validation of the plurality of sensitive attributes, wherein the validation report includes an explanation of the plurality of sensitive attributes and a recommendation for assigning sensitive attributes to data based on the statistical analysis.

9. A machine-learning based classifier integrity framework system comprising:

at least one memory storing machine executable instructions; and at least one processor communicatively coupled with the at least one memory and configured to execute the machine executable instructions to perform operations comprising:

receiving a sensitive data report identifying a dataset including one or more columns associated with personally identifiable information;

receiving configuration data of the machine learning-based classifier integrity framework system, the configuration data corresponds with a predefined list of rules;

scanning one or more cells of the dataset associated with a column of the one or more columns to generate an output corresponding to a plurality of sensitive attributes in the dataset using a classification model;

validating, based upon the sensitive data report and the configuration data, the output corresponding to the plurality of sensitive attributes, wherein validating the output corresponding to the sensitive attribute comprises:

computing a confidence level for the generated output corresponding to each of the plurality of sensitive attributes of the dataset;

ranking, based on the confidence level and the predefined list of rules defined by a user, the generated output corresponding to each of the plurality of sensitive attributes of the dataset; and determining, based on the ranking, the one or more cells of the dataset including the personally identifiable information; and generating, based upon the validating, a validation report comprising information on whether the one or more columns of the dataset identified as including the personally identifiable information comprises actual personally identifiable information, an additional review requirement to confirm whether the personally identifiable information is present, or the personally identifiable information is absent.

10. The machine-learning based classifier integrity framework system of claim 9, wherein the operations further comprise verifying whether the one or more cells of the dataset validated to include the personally identifiable information based on the ranking are included in the sensitive data report.

11. The machine-learning based classifier integrity framework system of claim 9, wherein the classification model includes a logistic regression model and/or a random forest model, and wherein the operations further comprise vectorizing data of the dataset using the classification model.

12. The machine-learning based classifier integrity framework system of claim 9, wherein the operations further comprise sampling the dataset prior to the scanning.

13. The machine-learning based classifier integrity framework system of claim 12, wherein the sampling is performed using Pyspark's sampling algorithm or Bernoulli sampling algorithm.

14. The machine-learning based classifier integrity framework system of claim 9, wherein the operations further comprise generating summaries for inclusion in the validation report, the summaries of the output corresponding to the plurality of sensitive attributes are generated using a large language model (LLM) based on a preference of a user.

15. The system of claim 9, wherein validating, based upon the sensitive data report and the configuration data, the output corresponding to the plurality of sensitive attributes further comprises:

determining a data count threshold specifying a percentage of data points classified under a sensitive data label relative to a total number of data points;

excluding, labels having a proportion lower than the data count threshold; and defining, a confidence level range, wherein the confidence level range is used to define a mapping between probabilities and confidence levels.

16. A non-transitory computer readable media comprising machine executable instructions stored thereon, which, when executed by at least one processor cause a machine-learning based classifier integrity framework system to perform operations comprising:

receiving a sensitive data report identifying a dataset including one or more columns associated with personally identifiable information;

receiving configuration data of the machine learning-based classifier integrity framework system, the configuration data corresponds with a predefined list of rules;

scanning one or more cells of the dataset associated with a column of the one or more columns to generate an output corresponding to a plurality of sensitive attributes in the dataset using a classification model;

validating, based upon the sensitive data report and the configuration data, the output corresponding to the plurality of sensitive attribute, wherein validating the output corresponding to the sensitive attributes comprises:

computing a confidence level for the generated output corresponding to each of the plurality of sensitive attributes of the dataset;

ranking, based on the confidence level and the predefined list of rules defined by a user, the generated output corresponding to each of the plurality of sensitive attributes of the dataset; and determining, based on the ranking, the one or more cells of the dataset including the personally identifiable information; and generating, based upon the validating, a validation report comprising information on whether the one or more columns of the dataset identified as including the personally identifiable information comprises actual personally identifiable information, an additional review requirement to confirm whether the personally identifiable information is present, or the personally identifiable information is absent.

17. The non-transitory computer readable media of claim 16, wherein the operations further comprise verifying whether the one or more cells of the dataset validated to include the personally identifiable information based on the ranking are included in the sensitive data report.

18. The non-transitory computer readable media of claim 16, wherein the classification model includes a logistic regression model and/or a random forest model, and wherein the operations further comprise vectorizing data of the dataset using the classification model.

19. The non-transitory computer readable media of claim 16, wherein the operations further comprise sampling the dataset prior to the scanning using Pyspark's sampling algorithm or Bernoulli sampling algorithm.

20. The non-transitory computer readable media of claim 16, wherein the operations further comprise generating summaries of the output corresponding to the plurality of sensitive attributes for inclusion in the validation report, the summaries are generated using a large language model (LLM) based on a preference of a user.

* * * * *